United States Patent

[11] 3,572,604

| [72] | Inventors | Erich Reth;<br>Karl Rebuschat, Duisburg, Germany |
|---|---|---|
| [21] | Appl. No. | 810,642 |
| [22] | Filed | Mar. 26, 1969 |
| [45] | Patented | Mar. 30, 1971 |
| [73] | Assignee | Demag Aktiengesellschaft<br>Duisburg, Germany |
| [32] | Priority | May 18, 1968 |
| [33] | | Germany |
| [31] | | P 17 61 434.5 |

[54] CONVEYOR DEVICE FOR COILING AND TYING WIRE
17 Claims, 6 Drawing Figs.

[52] U.S. Cl. ................................................. 242/79,
29/200
[51] Int. Cl. ................................................. B21c 47/24
[50] Field of Search........................................... 242/80, 79,
81, 25 (A); 29/(Inquired)

[56] References Cited
UNITED STATES PATENTS
1,968,474 7/1934 Abbott........................ 242/35.5
1,984,744 12/1934 Hood............................ 242/79

*Primary Examiner*—Nathan L. Mintz
*Attorney*—McGlew and Toren

ABSTRACT: Auxiliary equipment for use in a metallurgical plant following a rolling mill for handling rolled material in wire or strip form comprises a conveyor having a plurality of winding arbors thereon at spaced locations therealong. The conveyor is movable successively into association with equipment at a plurality of different stations. The equipment at a first station comprises means for effecting the winding of the wire over the arbor and includes means for positioning a surrounding shell around the arbor to aid in winding a vertical stack of successive coils of wire thereon. This station may also include means, for example; for surrounding the arbor with two half shell plates providing an outside guide for the wire coils. A second section advantageously includes means for strapping the vertical stack which is formed at the first station and tying the stacks into secure bundles by encircling them with wire for example.

Patented March 30, 1971 3,572,604

INVENTORS
Erich RETH
Karl REBUSCHAT

BY
McGlew & Toren
ATTORNEYS

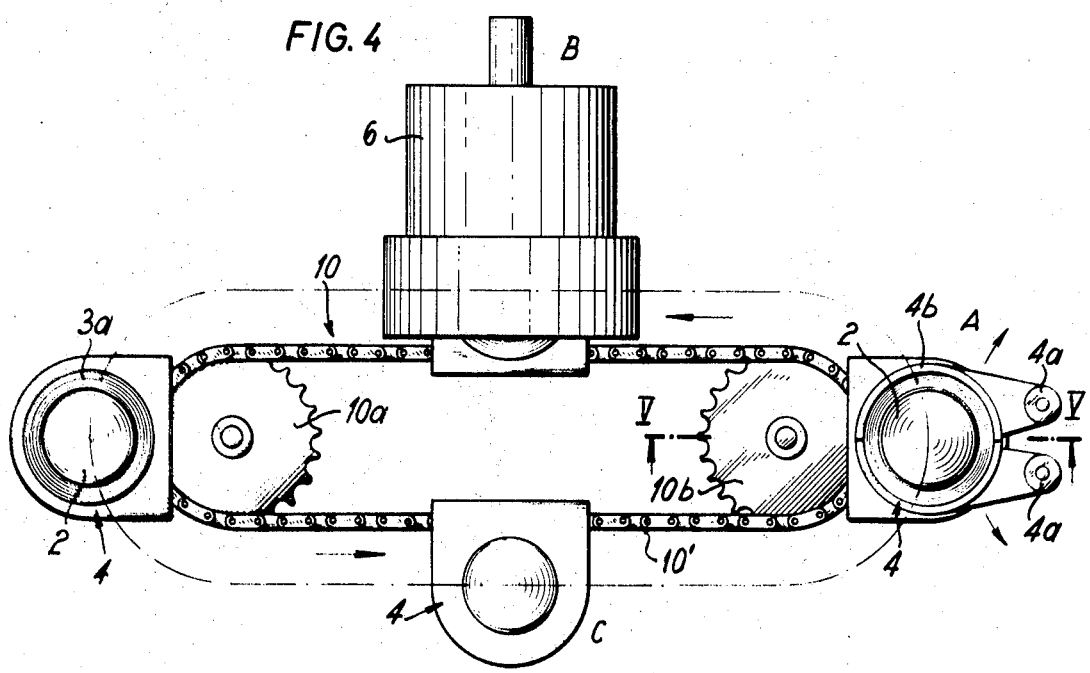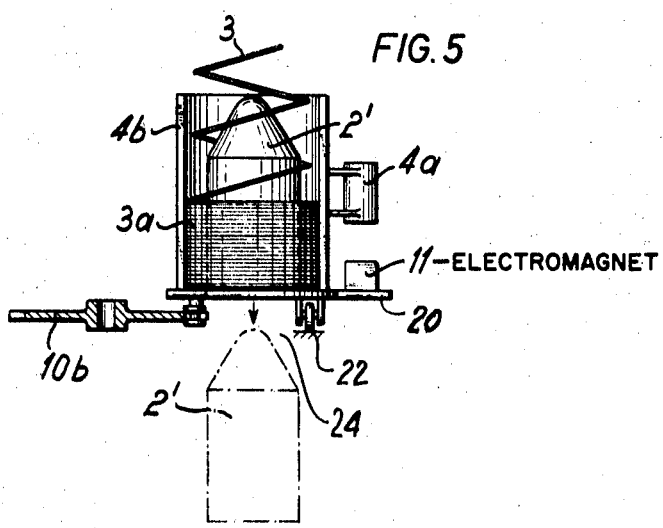

CONVEYOR DEVICE FOR COILING AND TYING WIRE

Another station includes means for removing the bundled stack from the conveyor for transportation to another handling station in the mill or for storage. The conveyor may take the form of an endless conveyor having only a horizontal path of movement, for example, in an oblong path or a circular path or a conveyor which has an upright horizontal feed and an inverted return feed of the arbor elements around which the wire may be coiled and stacked.

SUMMARY OF THE INVENTION

This invention relates, in general, to the construction of auxiliary equipment for metallurgical plants, and, in particular, to a new and useful apparatus for coiling, stacking, strapping and subsequently removing bundles of wire which are formed in a rolling mill.

For the best utilization of the modern rolling mills, in particular, wire rolling mills, it is desirable to produce the rolled material in the biggest possible coils. This results in relatively heavy coil bundle weights of more than a ton, in addition, the bundles or stacks of such coils are relatively high because it is difficult to change the outside or inside diameters for various operational reasons. In recent years, the methods controlling the cooling of such coils have required the enlargement of the coil heights.

At the present time, it is known to operate a wire metal by introducing rolled wire into automatically controlled water cooling chambers where the temperature of the rolled wire is reduced to approximately from 700° to 850° C. After this treatment, the wire is stacked onto four conveyor belts approximately 50 meters long; the further controlled cooling of the wire will take place on these belts in accordance with known methods. After leaving the belts, the stack rolled material is united in a coil-forming chamber to form coils on a mandrel. The wire which is coiled in stacks on the mandrel is then compressed in a separate coil station and strapped with steel strapping. The stacked coils then are gathered at a gathering station on a conveyor belt and thence delivered to a warehouse or shipping station.

Certain difficulties are encountered with the known devices in letting the start of the first windings which are to be received in a new vertical stack on a mandrel drop to a location at which the stack formation can begin. For this purpose, the plants in existence generally use a lift plate which is run up at the beginning of the wire coil formation to a position in which it cooperates as a guide with two arms located approximately at the coil outside diameter. In accordance with the increase in the wire layers on the mandrel, the lift plate is then slowly run down to permit accumulation of a vertical stack. When the mandrel is then shifted to a horizontal position, the lift plate serves to move the loose coil onto the second axis parallel mandrel for strapping.

It is easy to understand that the above-described equipment is extremely expensive and voluminous. The pivot point of the mandrel cross is approximately 1 meter above the floor level and the height of a single mandrel itself amounts to more than 3 meters. Machine heights of approximately 8 to 10 meters are thus required and half of this is located below floor level causing a rather expensive excavation and foundation work. Similar conditions prevail in respect to the length of the equipment which is required and this leads to excessively long and expensive buildings.

In accordance with the invention, there is provided a conveyor which is adapted to be cyclically moved in order to index a plurality of mandrels positioned thereon at various station locations. The station locations include one station having means for directing the rolled material in the form of coils around the mandrel and for this purpose, means such as an encircling guide shell is provided at the station for encircling the mandrel to provide an outside guide to facilitate winding the coils into a vertical stack. The conveyor may be indexed to position this mandrel which has been provided with a wound coiled stack of the rolled material to a next station at which means are provided for bundling the formed stack and applying a wire strapping therearound. A still further station which is in the path of movement of the conveyor provides means for lifting the strapped bundle off the mandrel or the conveyor and transporting it to a storage location or to a shipment location. The apparatus provides a safe means for forming the wire coils and stacking them in bundles and transporting them off to the conveyor without their tumbling.

Accordingly, it is an object of the invention to provide an apparatus for use in rolling mills which includes a conveyor for transporting a plurality of winding arbors through a path intersecting a plurality of operating stations, the operating stations including a first station for winding coils of wire around the arbor, a second station for tying the wound coils and a third station for removing the coils or for disassociating the coils from the conveyor.

A further object of the invention is to provide a conveyor device for facilitating the winding of rolled material into vertically coiled stacks and for tying these coiled stacks into bundles, and, wherein the conveyor may be, for example, a vertically or horizontally arranged conveyor or a flat turntable or plate member, the conveyor having associated therewith surrounding guide means for controlling the outside diameter of the coil around the winding arbors carried thereby and means for facilitating the removal of the arbor, if desired, for strapping and typing purposes.

A further object of the invention is to provide a device for coiling wire which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 1a is a top plan view of the dividing arbor;

FIG. 4 is a top plan view of still another embodiment of the conveyor; and

FIG. 5 is a section taken along the line V-V of FIG. 4.

DETAILED DESCRIPTION OF THE PREFERRED EMBODIMENTS

Figure 1:
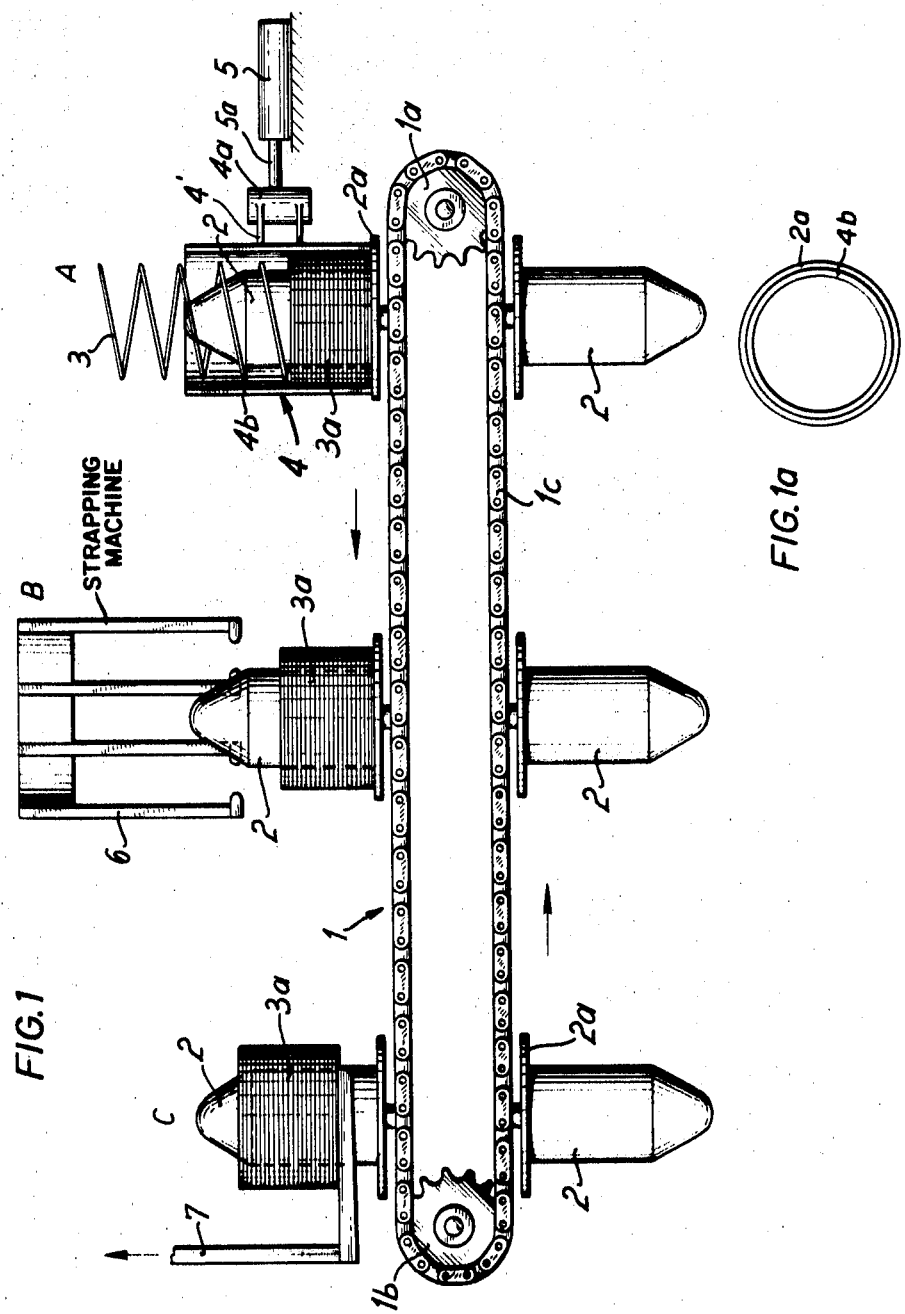
FIG. 1 is a schematic side elevational view of a conveyor for winding wire into vertical stacks and for tying the stacks and delivering them to a removal station constructed in accordance with the invention.

Referring to the drawings, in particular, the invention embodied therein in FIG. 1 comprises a vertically arranged endless chain conveyor generally designated 1 which is trained to run around spaced pulleys 1a and 1b which includes a conveyor chain 1c to which is secured a plurality of winding arbors or mandrels 2 at equally spaced locations therealong. The arbors or mandrels are indexed or cyclically moved through successive operating stations A, B and C. At the station A, the conveyor is stopped and rolled material in the form of wire coils 3 are delivered around the arbor 2 in order to accumulate the coils in a vertical bundle or stack 3a.

At the station A, guide means are provided for facilitating the coiling of the wire into the vertical stack and these guide means, in the embodiment illustrated, comprise a shell generally designated 4 which is made up of two semicylindrical shell elements 4b, 4b which are carried on arms 4' which are pivoted on pivot pin elements 4a. The pivot pin elements 4a, together with the arms 4', may be swung outwardly in respective opposite diverging directions as indicated, for example, by the arrows in FIG. 4 by the operation of a control motor 5 having a shaft 5a with suitable gearing connected to the pivot members 4a (not shown) to effect their inward or outward swinging movement as desired. When the arbor 2 which includes a base or platform 2a, arrives at the station A, the shell portions are moved together to form the encircling shell 4 which provides an outer guide for the wire coils. After the complete vertical stack 3a is formed, the shell halves may be moved apart by operation of the motor 5 and the conveyor is again started to transport the arbor 2 with the coiled stack 3a to the station indicated B.

At the station B, the coil 3a is strapped by means of the equipment generally designated 6 and schematically indicated. A strapping machine 6 is of well-known construction and may, for example, be of a type in which wire strapping or steel strapping is encircled around the vertical stack at at least two diametric locations, for example, If, instead of the usual dual strapping a quadruple strapping is desired or required, each winding arbor 2 is advantageously mounted so that it may be pivoted about its longitudinal center line in the manner of a divider head up to a certain angular extent, for example, 90° when quadruple strapping is required.

The conveyor is again started and the arbor with the strapped vertical stack 3a is presented at the station C, where it is lifted off the mandrel 2 by means of the lifting equipment 7 which may, for example, comprise a fork stacker or the like and it is then delivered to the warehouse or to a shipping station.

The arbors 2 are moved in their return movement at the lower reach of the conveyor 1 in an inverted position as shown in FIG. 1.

Figure 2:
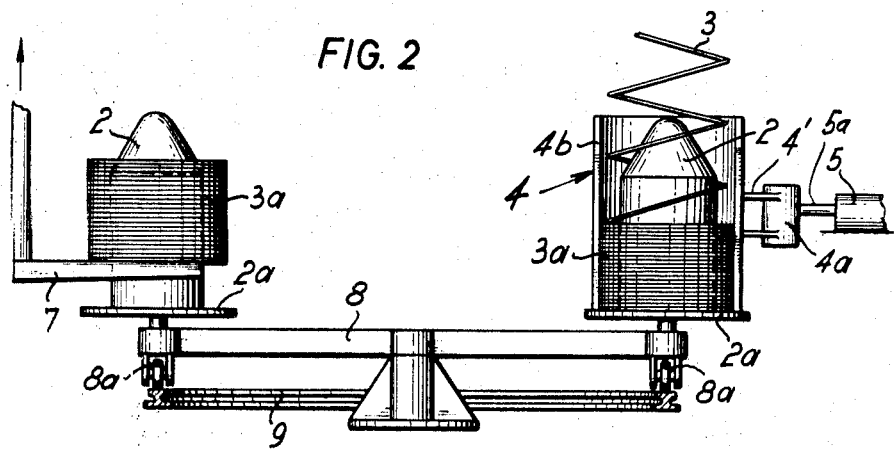
FIG. 2 is a transverse sectional view of another embodiment of the conveyor.
Figure 3:
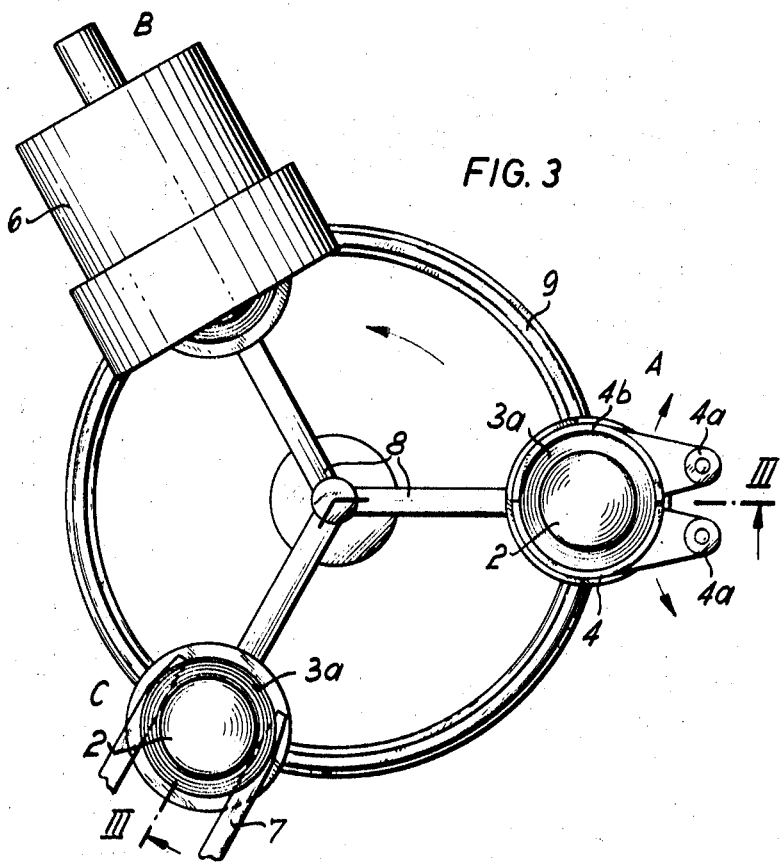
FIG. 3 is a top plan view of the conveyor indicated in FIG. 2.

In the embodiment indicated in FIGS. 2 and 3, instead of a chain conveyor 1, a turntable 8 is employed which revolves on rollers 8a on a base plate 9. In this arrangement, the same stations A, B and C are provided together with the indicated guide means 4, strapping means 6 and lifting means 7. The arbors 2 which are similar to the arbors indicated in the other embodiment are indexed through stations A, B and C as described above.

A similar arrangement is also provided in the embodiments indicated in FIGS. 4 and 5. In this construction, instead of a vertically arranged conveyor, there is provided a horizontal conveyor 10 which includes an endless chain 10' which moves around the rollers 10a and 10b in the direction of the arrows indicated. In this construction, the wire stacks 3a are accumulated above a winding platform 20 which is engaged at the inner end to the chain 10' and which includes rollers 22 which ride around on a plate or guide leaving an opening 24 at the station A to permit downward withdrawal of the arbor 2' to the dotted line position indicated in FIG. 5 leaving the vertical stack 3a on the table 20 for transportation to the next station D.

In the embodiment as particularly indicated in FIG. 5 the shell parts 4b, 4b making up the guide means 4 are separated by means of electrically actuated magnet elements 11 which are disposed adjacent each shell portion in the position to magnetically attract each portion in order to withdraw the guide means from the stack 3a after it has accumulated on the platform 20 around the mandrel 2'.

Since normally speaking the strapping device 6 includes arm members which must pass through the center of the wound coil stack 3a, this may be accomplished by forming the arbors 2 or 2' with recesses to accommodate these elements. The surrounding guide means 4 may be similarly formed with recess elements to permit passage of the operating arms of the tying machine 6.

We claim:

1. A device for handling rolled wire or strip material formed in a metallurgical plant such as a rolling mill, comprising a conveyor having a plurality of winding arbors thereon at spaced locations therealong, a plurality of operating stations located along said conveyor including a first station for delivering coils of the material around the arbor to form a stack of the material, a second station with means for tying each stack into a bundle, and a third station for disassociating the tied stack from the conveyor, said conveyor being movable to present the arbor in association with said first station for the forming of the windings therearound and to deliver the wound stack to a second station for the tying of the stack and to deliver the tied stack to the third station for the disassociation of the tied stack from the conveyor.

2. A device, according to claim 1, wherein said conveyor comprises a chain conveyor.

3. A device, according to claim 1, wherein said conveyor comprises a turntable.

4. A device, according to claim 1, wherein said conveyor comprises a horizontally arranged endless conveyor.

5. A device, according to claim 1, wherein said conveyor comprises a chain conveyor, said winding arbors being rigidly secured to said chain conveyor at equally spaced locations therealong.

6. A device, according to claim 1, wherein said conveyor comprises a flat plate conveyor of generally circular configuration and including at least three winding arbors arranged on said plate conveyor at equally spaced locations around its circumference.

7. A device according to claim 1, including means mounting said arbors for movement in directions parallel to their longitudinal axes.

8. A device, according to claim 1, including a guiding shell defined around each of said winding arbors for guiding the wire centrally between said shell and said arbor.

9. A device, according to claim 1, including means mounting said winding arbor on said conveyor permitting vertical movement of said arbor, said arbor including a surrounding platform for supporting a coiled stack when said mandrel is lowered beneath said platform.

10. A device, according to claim 1, wherein said guide means includes first and second shell members pivotally mounted adjacent said winding arbors and being movable together to surround said mandrels at a spaced location therefrom.

11. A device, according to claim 10, including power-operated means for pivoting said shell portions.

12. A device, according to claim 11, wherein said power-operated means comprises a hydraulic cylinder having a piston slidable therein and connected to each of said shells for shifting said shells to open and to enclose said mandrel.

13. A device, according to claim 11, wherein said power-operated means comprises an electric magnet disposed adjacent each of said shells and being actuable to attract said shells to open said shells.

14. A wire handling device, comprising a platform for the stacking of coils of wire thereon adapted to be connected to a conveyor, a mandrel associated with said platform and being adapted to be located to project above said platform and to leave an annular space therearound for collecting wire coils thereon, and external guide means associated with said platform and being movable in a direction toward said platform to enclose a space surrounding and spaced from said mandrel above said platform.

15. A wire handling device, according to claim 15, wherein said guide means comprises first and second half shell portions mounted at respective opposite sides of said mandrel and being movable inwardly to enclose a space surrounding said mandrel but spaced from said mandrel by an amount sufficient to permit accumulation of the coils of wire therebetween.

16. A wire handling device, according to claim 15, including means connecting said platform to a moving conveyor.

17. A wire handling device, according to claim 14, including a conveyor connected to said platform, said platform having a central opened portion, said mandrel being movable vertically through said central opened portion to permit positioning of said mandrel above said platform for accumulating coils of a material therearound and for permitting withdrawal of said mandrel downwardly through said platform to permit separation of said mandrel from the coiled stack.